United States Patent [19]
Feldmann

[11] Patent Number: 5,338,152
[45] Date of Patent: Aug. 16, 1994

[54] ARRANGEMENT FOR SEALING STRUCTURAL MEMBERS USING A V-SHAPED INSERT, PARTICULARLY IN THE CASE OF TURBO-ENGINES

[75] Inventor: Manfred Feldmann, Puchheim, Fed. Rep. of Germany

[73] Assignee: MTU Motoren- Und Turbinen-Union Muenchen GmbH, Fed. Rep. of Germany

[21] Appl. No.: 57,773

[22] Filed: May 6, 1993

[30] Foreign Application Priority Data

May 11, 1992 [DE] Fed. Rep. of Germany ....... 4215440

[51] Int. Cl.⁵ ............................................. F01D 11/00
[52] U.S. Cl. ..................... 415/139; 415/138; 415/191; 277/199
[58] Field of Search ............... 415/134, 136, 137, 138, 415/139, 209.1, 209.2, 209.3, 209.4, 191; 277/27, 198, 199, 205

[56] References Cited

U.S. PATENT DOCUMENTS

| | | | |
|---|---|---|---|
| 3,112,915 | 12/1963 | Morris | 416/244 R |
| 3,728,041 | 4/1973 | Bertelson | 415/139 |
| 3,970,318 | 7/1976 | Tuley | 415/139 |
| 4,439,982 | 4/1984 | Weiler et al. | 415/139 |
| 4,524,980 | 6/1985 | Lillibridge et al. | 415/191 |
| 5,154,577 | 10/1992 | Kellock et al. | 415/134 |

Primary Examiner—Edward K. Look
Assistant Examiner—Michael S. Lee
Attorney, Agent, or Firm—Evenson, McKeown, Edwards & Lenahan

[57] ABSTRACT

An arrangement for sealing structural members particularly in the case of turbo-engines is provided. A structural member is to be divided along a first plane into segments, which can be moved relative to one another, and is to be movable in a second plane which is angularly offset with respect to the first plane. Projections of the segments sealingly engage in a groove of an additional structural member. Expansion gaps, which are arranged between abutting edges of the segments, are to be sealed off longitudinally and transversely with respect to the course of the gap by sealing plates. In this case, each expansion gap is to be sealed off between a sealing plate arranged transversely to the course of the gap and an opposing surface of the groove acting as a sealing surface by means of a V-shaped insert. The V-shaped insert is actuated by a local pressure difference; is arranged using free legs which spread open in the direction of the groove base; and is expanded in the direction of the opposite sealing surface of the groove.

10 Claims, 6 Drawing Sheets

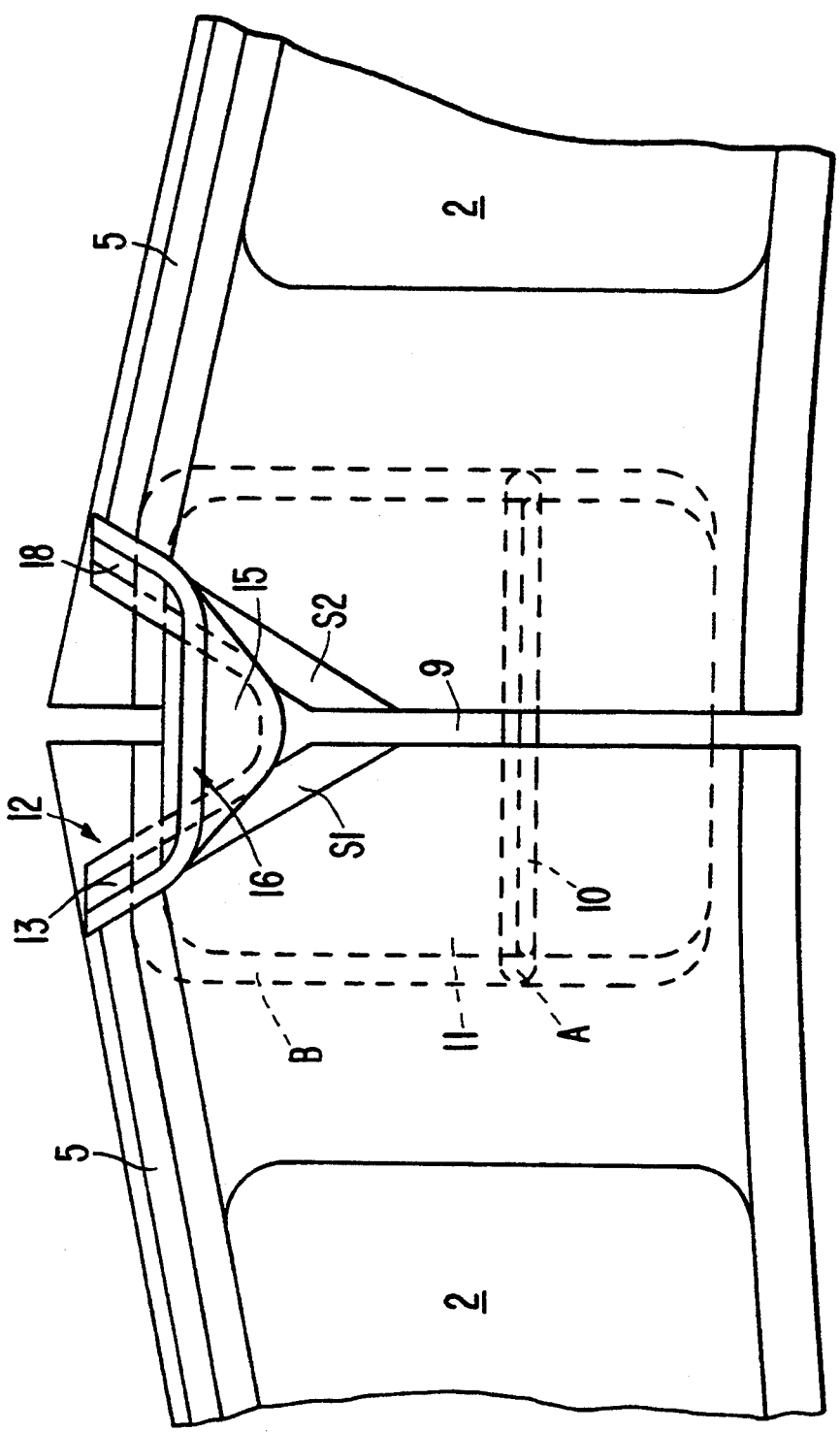

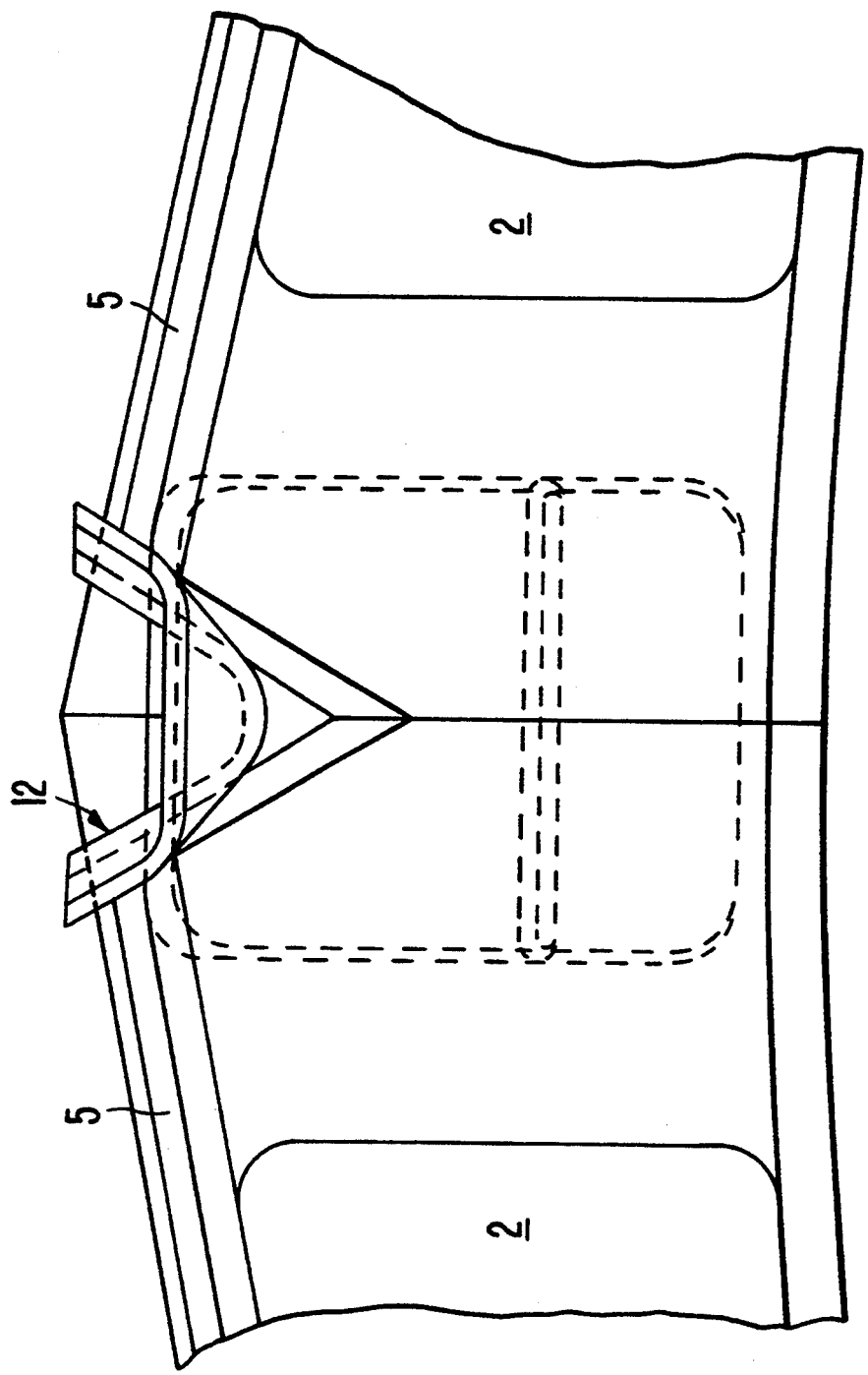

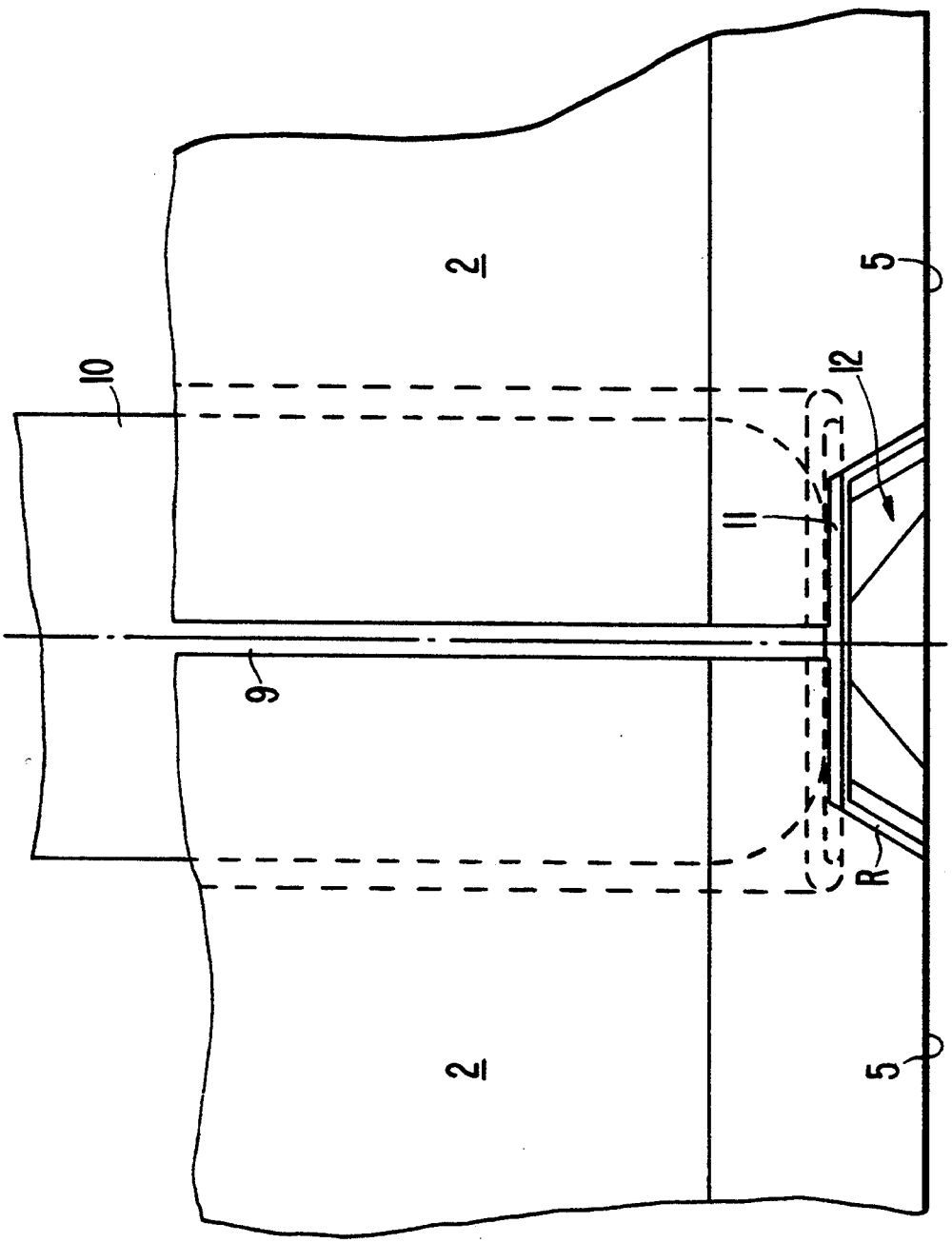

ARRANGEMENT FOR SEALING STRUCTURAL MEMBERS USING A V-SHAPED INSERT, PARTICULARLY IN THE CASE OF TURBO-ENGINES

BACKGROUND AND SUMMARY OF THE INVENTION

This invention relates to an arrangement for sealing structural members, particularly in the case of turbo-engines. A structural member is divided along a first plane into segments, which can be moved relative to one another. The structural member is movable in a second plane, which is angularly offset with respect to the first plane. Projections of the segments engage sealingly in a groove of an additional structural member. Expansion gaps are arranged between abutting edges of the segments and are sealed off longitudinally and transversely with respect to the course of the gap via sealing plates.

In the case of turbo-engines, particularly gas turbine engines, guiding baffles of turbines are divided into segments along their circumference, while expansion gaps are left, in order to control differential expansions in the circumferential direction which occur with respect to nonsteady operating conditions. In addition, such guiding baffles, by way of the shroud segments, are arranged radially inside or radially outside on at least one point by means of projections or webs which extend along the circumference. In this manner, the guiding baffles can be moved in the radial direction on grooves of the turbine housing in order to compensate different radial relative expansions with respect to the housing. As a result of the above-mentioned arrangement, thermally caused tensions which occur at the guiding baffle can be reduced.

In the interest of low process losses, the expansion gaps between the shroud segments are sealed off by sealing plates which movably engage in mutual open recesses on the abutting edges. The sealing plates, in view of the course of the expansion gaps and of the projections or webs, abut on one another while they are mutually offset with respect to one another in an axial/radial manner.

In the case of this arrangement, the web or the projection also forms a sealing surface at least with respect to a groove surface. Furthermore, it is a prerequisite that the expansion gaps on the side facing away from the hot gas flow in the guiding baffle, together with the sealing plates, are acted upon by sealing air taken out of the compressor and possibly used also for the cooling of the turbine housing. Because of the movable arrangement of the sealing plates, sealing air circulations against the hot gas flow are virtually unavoidable. In the case of this arrangement, a leakage flow proportion of sealing air, which locally is comparatively large, will occur at the point of the expansion gap, i.e., between the sealing plate, which is in each case arranged radially at the level of the web or the projection, and the corresponding opposite sealing surface of the groove on the projection.

The indicated problems analogously also occur in the case of other combinations of structural members, of which one structural member is segmented in the longitudinal direction.

There is therefore needed a sealing arrangement of the above-described type which, particularly in view of the mentioned critical point on the respective expansion gap of the segmented structural member, creates an optimal sealing which is connected with extremely low process losses.

According to the present invention, this need is met by an arrangement for sealing structural members, particularly in the case of turbo-engines. A structural member is divided along a first plane into segments, which can be moved relative to one another. The structural member is movable in a second plane, which is angularly offset with respect to the first plane. Projections of the segments engage sealingly in a groove of an additional structural member. Expansion gaps are arranged between abutting edges of the segments and are sealed off longitudinally and transversely with respect to the course of the gap via sealing plates. Each expansion gap is sealed off between a sealing plate, which is arranged transversely with respect to the course of the gap, and an opposite surface of the groove acting as a sealing surface, via a V-shaped insert. The V-shaped insert is actuated by a local pressure difference; is arranged in the direction of the groove base using free legs which spread open; is expanded via two legs in the direction of the opposite sealing surface of the groove; is disposed via the expansion in a sealing manner on corresponding oblique abutting surfaces of the segments; and covers the expansion gap via a base wall sloping in the direction of its sealing end face on the groove between both legs.

In this manner, a highly effective sealing of the points of the expansion gaps that are indicated to be critical is achieved In other words, it is achieved that that particular leakage flow of the sealing fluid which consists, for example, of supplied high-pressure air, is drastically reduced. That is the result of the local overflowing of the sealing plate which is arranged radially or approximately in parallel with respect to the locally bent course of the projections.

The present invention is based on a sufficient pressure difference between the fluid pressure (sealing air), which exists at the groove, and the fluid pressure, particularly the hot gas pressure, which exists downstream of the V-shaped insert and is static, for example. In the case of this arrangement, an insert with three sealing surfaces is obtained. These three sealing surfaces are the rear end face disposed on one side of the groove, and the two sealing surfaces which are constructed laterally on the legs. The two sealing surfaces constructed laterally on the legs follow a V-course and are also sloped as a result of the widening of the insert in the direction of the one groove side. With this additional slope, the insert is pressed by way of the pressure difference with its rear end face in a sealing manner against the one side of the groove. As a result of the V-shape, the insert forms sliding surfaces in order to compensate manufacturing tolerances and temperature-caused changes of the expansion gaps. The flattened and correspondingly sloped center or base wall between the two legs of the insert forms relatively large pressure surfaces at the expansion gap which are acted upon by differential pressure. At the mentioned point of the expansion gap, the insert can easily be mounted from the outside. In this case, the local point of the gap has a correspondingly preprofiled recess for the insert between adjacent abutting edges of the segments. In view of the generally relatively small gap width, the insert therefore forms comparatively large structural member surfaces which are effective for the differential pressure.

BRIEF DESCRIPTION OF THE DRAWINGS

FIGS. 5a–5b are rear views and FIG. 5c is a top view showing the corresponding oblique abutting surfaces S1, S2 on which the insert 12 is disposed, terminating uniformly in the expansion gap;

DETAILED DESCRIPTION OF THE DRAWINGS

Figure 1:
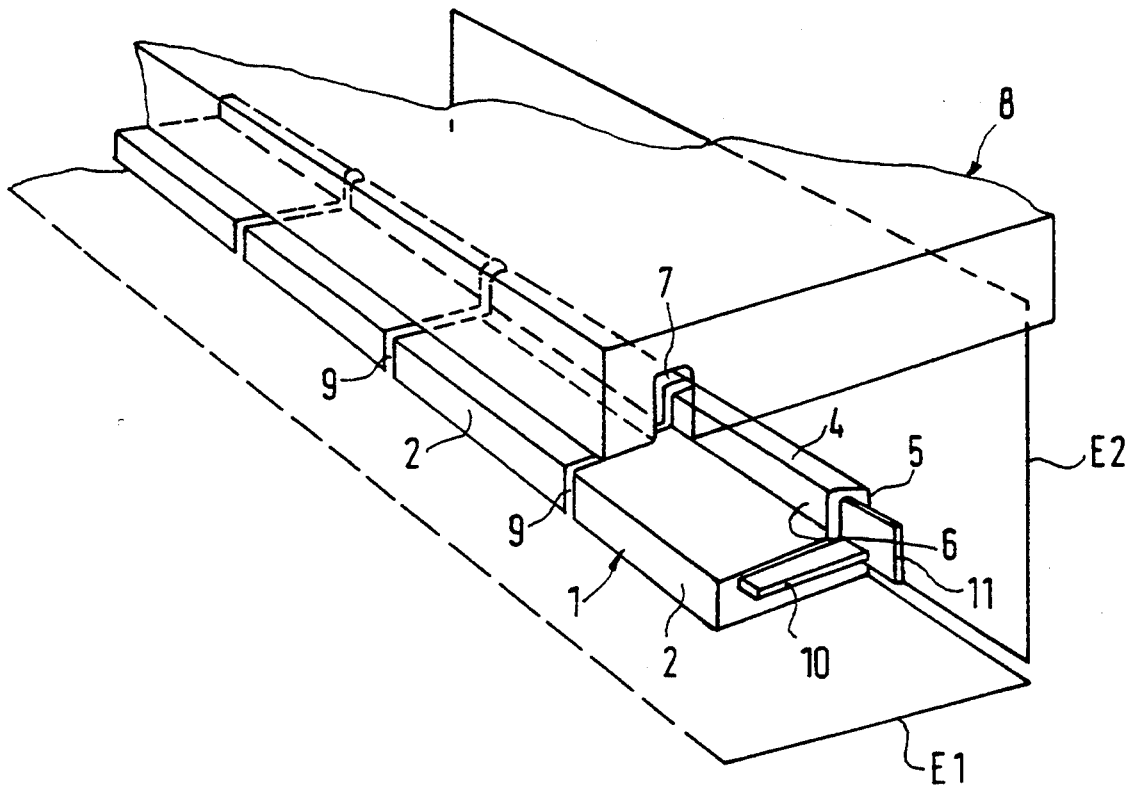
FIG. 1 is a schematic perspective view of the sealing arrangement between a structural member which is segmented in the longitudinal direction and which, via projections which are bent away from it, movably engages in a groove of another structural member.

FIG. 1 illustrates a structural member i which is divided along a first plane E1 into segments 2 which can be moved relative to one another. Via projections 6 or webs bent off on one side from the segments 2, the structural member 1 movably engages in a second plane E2 with local sealing surfaces 4, 5, in the groove 7 of another structural member 8. The second plane E2, in this case, is offset at a right angle with respect to the first plane E1. Expansion gaps 9, arranged between the abutting edges of the segments 2, are sealed off by sealing plates 10, 11. These sealing plates 10, 11 abut with one another in the direction of the planes E1, E2 in an angularly offset manner, or they provide a sealing along and transversely with respect to the course of the gap. Furthermore, the sealing plates 10, 11 (also see FIG. 6) each engage movably or with play, by means of their respective lateral ends, in recesses A, B which are open with respect to the abutting edges on the expansion gaps 9.

FIG. 1 may also be modified in such a manner that the additional structural member 8, in a manner similar to a nozzle wall, extends on edge or in parallel to the second plane E2. In this case, the structural member 1 may be a duct wall which is divided into expansion gaps 2. Similar or comparable structural member sealing combinations can also be found in the case of heat exchangers. In this case, the guide wall of a tube matrix, which is segmented, engages by means of projections 6 in the housing 8 of the heat exchanger. This invention may also be used for cases of this type.

Figure 2:
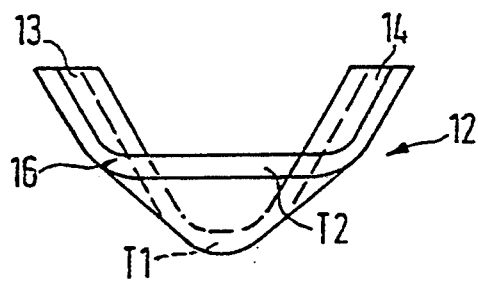
FIG. 2 is a rear view of an insert according to the present invention which is suitable for the application in the case of FIG. 1.
Figure 3:
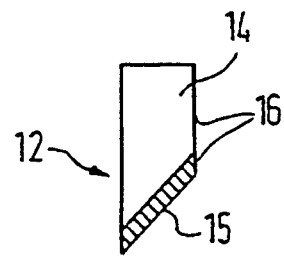
FIG. 3 is a longitudinal sectional center view of an insert according to the present invention which is suitable for the application in the case of FIG. 1.

According to the present invention, for example, each expansion gap 9 of the respective structural member 1 (according to FIGS. 5 to 7) between the abutting edges of the outer shroud segments 2 of a turbine guide baffle of a high-pressure turbine is to be sealed off at a gap point which occurs between the sealing plate 11 and the opposite surface of the groove 7 which is in the rear in this case. The sealing point 11 extends radially with respect to the course of the gap, in the webs 6. At this point, each expansion gap 9 is to be sealed off using the V-shaped insert 12 according to FIGS. 2 to 4.

Figure 6:
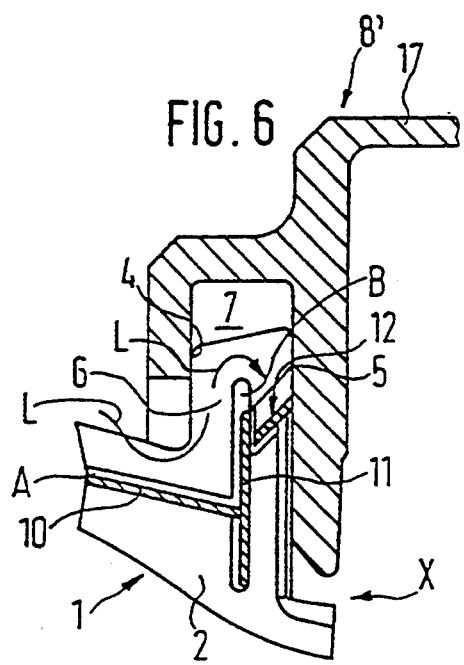
FIG. 6 is a view of a gap-side downstream end of the abutting edge which engages into a circumferential groove of a sealing support on the turbine housing, by means of the projection bent away from the outer shroud segment and by means of sealing surfaces together with sealing plates which abut at an angle.
Figure 7:
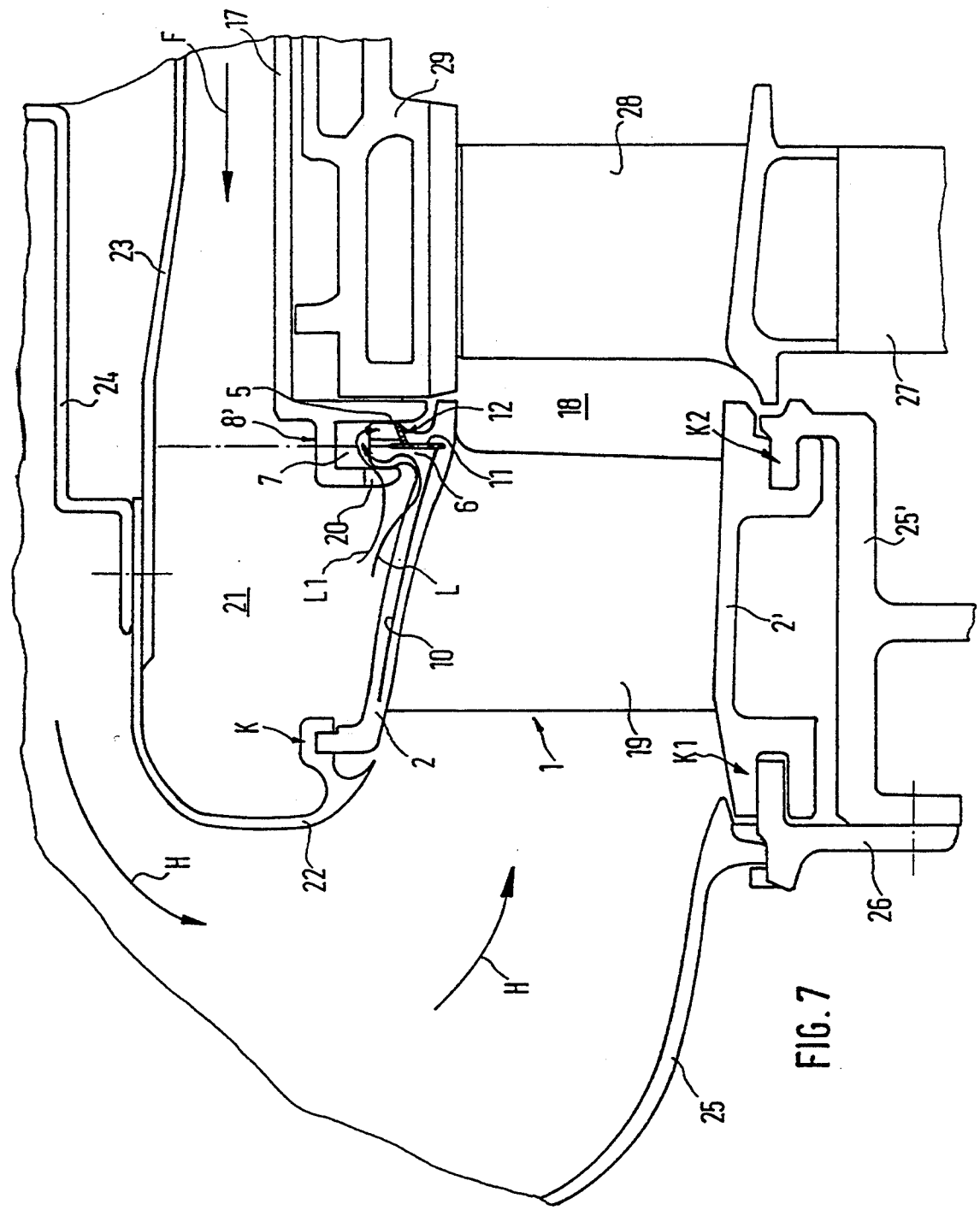
FIG. 7 is a longitudinal sectional center view of a local high-pressure turbine section with assigned sections of the flame tube of an annular reversed-operation combustion chamber and with the sealing arrangement on a guide blade segment.

Using the sealing surfaces 4, 5 (FIG. 6), which were mentioned with respect to FIG. 1, along the forward and rearward front faces of the projections 6 on the segments 2, the guide baffle, as the corresponding structural member 1, is suspended to be movable in the radial direction in the groove 7 of the sealing support 8' of a housing wall section 17 (FIG. 7). Using the insert 12, as a priority, the particular proportion L of the leakage (FIG. 6) of sealing air that, radially on the outside, would normally flow virtually in an unimpaired manner around the respective sealing plate 11 and would flow off via the mentioned residual gap part into the hot gas duct 18 (FIG. 7) downstream of the trailing edges of the guide blades 19 is drastically reduced.

According to FIG. 7, for example, in contrast to FIG. 6, only the rear axial face 5 is sealingly effective on the projection 6 because, for example, the forward arm of the sealing support 8' has recesses 20 which are distributed along the circumference and thus essentially forms only axial supporting surfaces for the projections 6. Therefore, in the case of FIG. 7, in addition to the leakage proportion L, leakage proportion L1 of sealing air resulting from the recesses 20 can also be drastically reduced by way of the insert 12.

Figure 4:
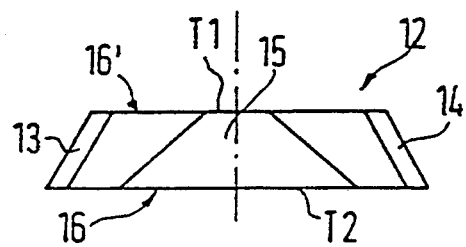
FIG. 4 is a top view of an insert according to the present invention which is suitable for the application in the case of FIG. 1.

In particular, the rear view (FIG. 2) of the insert shows the basic V-shape with the two free legs 13, 14, which spread open laterally from the base wall 15. Using the free legs 13, 14, the insert 12 is, in addition, expanded on both sides from the forward end face 16' in the direction of its rear end face 16 (FIG. 4). On end face 16, the pertaining part T2 of the base wall 15 ends essentially in a straight line, while the part T1 of the base wall 15, which is narrower relative to it, is curved on the forward end face 16'. As can be recognized from FIG. 3, the base wall 15 of the insert 12 is constructed in a sloped manner from the downward front to the upward rear. Because of such a slope, the insert 12 is installed relative to the axis of the turbine, on the residual gap, between the radial sealing plate 11 (FIG. 6 and 7) and the adjacent one surface of the groove 7 (operating position). In this installed situation, the insert 12 covers, with its essentially flattened base wall 15, the mentioned residual part of the expansion gap 9. In this case, the free ends of the two legs 13, 14 are disposed opposite the groove base and the two legs 13, 14, at the same time, during the operation are sealingly disposed on corresponding oblique abutting surfaces ST (FIGS. 5a–5c) of the segments 2 on the gap 9 by means of the actuating of the differential pressure. By the actuating of the differential pressure during the operation, the insert 12, in addition along its rear end face 16, forms a complete sealing fit on the adjacent opposite surface of the groove 7 (FIG. 6). In this case, the local sealing surfaces 5 on the rear front sides of the projections 6 extend in a plane-parallel manner with respect to the locally adjacent sections of the rear end face 16 of the insert 12.

According to FIG. 7, an annulus 21 is supplied with housing cooling air and sealing air (arrow F). The annulus 21 is enclosed between the housing wall section 17 with the sealing support 8', the radially exterior shroud segments 2, a flame tube part 22, which deflects the hot gas flow H on the inside in an aerodynamically advantageous manner, and a housing wall part 23 which is connected with the latter. Another locally stepped flame tube part 24 of the combustion chamber is connected with parts 22 and 23.

From the cooling sealing air F supplied to the annulus 21, among others, the above-mentioned leakage proportions L, L1 are obtained. The differential pressure actuation of the insert 12 therefore takes place by way of the air pressure in the annulus 21 which exists upstream of the insert 12 and which is larger than the static pressure of the hot gas flow which exists locally in the turbine duct 18, in the area downstream of the trailing edges of the guide blades 19.

FIG. 7 also shows a flame tube part 25 which guides the hot gas flow H on the outside and deflects it in the direction of the guiding baffle 1. The guiding baffle 1 is suspended frontally above, according to K, over the outer shroud segments 2 axially/radially in the manner of a hook on the flame tube part 22. If necessary, the flame tube part 22 may be constructed to be radially elastic. In addition, the guiding baffle 1, by way of shroud segments 2' on the side of the blade base, is suspended on the upstream and downstream side in a radially immobile hook-type manner (K1, K2). Specifically, the guiding baffle 1 is suspended on a guide blade support 25' or on a suspension part 26 for the flame tube part 25 connected with it. In addition, the rotating blades 28 which are anchored on the outer circumference of a wheel disk 27, and whose tips are surrounded by a housing ring 29 while leaving radial gaps, are part of the high-pressure turbine stage.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement for sealing structural members between flow channels being supplied by fluids of different pressures, comprising:
   a first structural member divided along a first plane into segments that are movable relative to one another, the first structural member being movable in a second plane that is angularly offset with respect to the first plane;
   a second structural member having a groove, wherein projections of the segments sealingly engage in the groove;
   expansion gaps arranged between abutting edges of the segments;
   sealing plates sealing-off the expansion gaps longitudinally and transversely with respect to a course of the gaps;
   a V-shaped insert, each for sealing-off one of the expansion gaps between one plate arranged transversely with respect to the course of the gap and an opposite transverse surface of the groove acting as a sealing surface for one end face of said insert;
   the V-shaped insert having two legs following said V-shape and projecting freely towards a base of said groove,
   wherein the insert is uniformly expanded via the two legs towards the opposingly facing sealing surface of the groove;
   wherein the insert is disposed via the expansion of the V-shaped legs in a sealing manner on corresponding oblique abutting surfaces of two segments at one expansion gap;
   wherein the V-shaped insert covers the expansion gap with a base wall between the two legs sloping in the direction of its sealing end face on the opposite transverse surface of the groove;
   wherein the V-shaped insert is actuated by a partial pressure of said fluids, the fluid pressure acting before the insert in the groove is greater than the fluid pressure acting behind the insert at the expansion gap.

2. An arrangement according to claim 1, wherein the groove is arranged on a housing-type sealing support of the second structural member.

3. An arrangement according to claim 2, wherein the first plane is an annular plane, the segments of the first structural member in this annular plane being shroud segments of a guiding baffle of a turbine which is segmented along the circumference, the second structural member being a housing wall section of the turbine with the groove which extends on it along the circumference.

4. An arrangement according to claim 2, wherein the first structural member and the second structural member are wall elements of one of a propelling nozzle and an air inlet of a turbo-engine.

5. An arrangement according to claim 4, wherein the turbo-engine is a turboramjet engine.

6. An arrangement according to claim 1, wherein the first plane is an annular plane, the segments of the first structural member in this annular plane being shroud segments of a guiding baffle of a turbine which is segmented along the circumference, the second structural member being a housing wall section of the turbine with the groove which extends on it along the circumference.

7. An arrangement according to claim 1, wherein the first structural member and the second structural member are wall elements of one of a propelling nozzle and an air inlet of a turbo-engine.

8. An arrangement according to claim 7, wherein the turbo-engine is a turboramjet engine.

9. An arrangement according to claim 1, wherein the arrangement for sealing structural members is used in a turbo-engine.

10. An arrangement according to claim 1, wherein the corresponding oblique abutting surfaces on which the insert is disposed via the expansion of the V-shaped legs are formed by a correspondingly preprofiled recess for the insert between adjacent abutting edges of two segments.

* * * * *